(12) United States Patent
Higashitani

(10) Patent No.: US 9,366,794 B2
(45) Date of Patent: Jun. 14, 2016

(54) LIGHT GUIDE AND ILLUMINATION DEVICE

(71) Applicant: KYOCERA Document Solutions Inc., Osaka (JP)

(72) Inventor: Masahiro Higashitani, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 36 days.

(21) Appl. No.: 14/609,194

(22) Filed: Jan. 29, 2015

(65) Prior Publication Data

US 2015/0219841 A1     Aug. 6, 2015

(30) Foreign Application Priority Data

Jan. 31, 2014   (JP) .................................. 2014-017202

(51) Int. Cl.
*F21V 8/00* (2006.01)

(52) U.S. Cl.
CPC ........... *G02B 6/0006* (2013.01); *F21V 2200/00* (2015.01); *G02B 6/0001* (2013.01); *G02B 6/001* (2013.01)

(58) Field of Classification Search
CPC .... G02B 6/0096; G02B 6/0006; G02B 6/001; G02B 1/045; G02B 6/00; G02B 6/0001; F21S 48/1241; B60Q 1/0011; B60Q 3/002; B60Q 3/004; F21V 5/043; F21V 2200/00; F21V 2200/40; G02F 1/133524
See application file for complete search history.

(56) References Cited

U.S. PATENT DOCUMENTS

| | | | | |
|---|---|---|---|---|
| 7,111,972 B2* | 9/2006 | Coushaine | ................ | F21K 9/00 362/240 |
| 7,287,896 B2* | 10/2007 | Okamoto | .............. | F21S 48/211 362/248 |
| 8,662,723 B2* | 3/2014 | Schmierer | ............ | B60Q 1/2665 362/494 |
| 8,780,419 B2* | 7/2014 | Higashitani | .......... | G02B 6/0038 358/474 |
| 2010/0014315 A1* | 1/2010 | Fujimoto | ............... | G02B 6/001 362/615 |
| 2013/0077285 A1* | 3/2013 | Isogai | ..................... | F21K 9/135 362/84 |

FOREIGN PATENT DOCUMENTS

JP         2013-012867 A      1/2013

* cited by examiner

*Primary Examiner* — Bao Q Truong

(57) ABSTRACT

A rod-shaped light guide operable to guide light entering a lateral end surface thereof to exit through a surface thereof is provided with: a recess in one lateral end thereof, having a predetermined depth in a longitudinal direction thereof, a bottom of the recess forming the lateral end surface; a positioning boss extending in the longitudinal direction from the one lateral end and inserted into a positioning hole in a substrate with a light source; and an engagement portion formed at the one lateral end to engage the substrate positioned by the positioning boss to the one lateral end so that a front surface of the substrate can abut on the one lateral end and the light source can be accommodated in the recess while being kept at a certain distance from the lateral end surface, the positioning boss and the engagement portion being formed integrally with the light guide.

6 Claims, 6 Drawing Sheets

LIGHT GUIDE AND ILLUMINATION DEVICE

INCORPORATION BY REFERENCE

This application claims priority to Japanese Patent Application No. 2014-17202 filed on Jan. 31, 2014, the entire contents of which are incorporated by reference herein.

BACKGROUND

The present disclosure relates to light guides and illumination devices and particularly relates to a structure of a rod-shaped light guide in which light incident on a lateral end surface thereof is guided to exit the light through an exit surface thereof which is a radially oriented surface thereof.

Some image forming apparatuses, such as multifunction peripherals, employ as a light source section for an image reading device, such as a scanner, a line light source in which a rod-shaped, resin-made light guide is combined with a light source (for example, an LED) capable of emitting light to the interior of the light guide through one lateral end of the light guide which is a longitudinal end thereof. The light source section is required to linearly illuminate an original document to be read in synchronism with reading of a line sensor. For this purpose, a surface of the light guide opposite to an exit surface thereof through which light exits the light guide is provided with light reflecting or scattering patterns, so that the patterns can deflect light, which has entered the light guide, toward the exit surface to allow linear illuminating light to exit the light guide in the direction toward the original document. For example, an image reading device is known in which a hollow light guide member is interposed between a light source and an incident surface of a light guide to reduce the increase in temperature of the light guide.

SUMMARY

A technique further modified from the above known technique is proposed as an aspect of the present disclosure.

A light guide according to an aspect of the present disclosure is a rod-shaped light guide operable to guide light incident on a lateral end surface of the light guide to exit the light through a surface thereof. The light guide is provided with a recess formed in one lateral end thereof to have a predetermined depth in a longitudinal direction thereof and a bottom of the recess in the longitudinal direction forms the lateral end surface of the light guide.

The light guide is further provided with a positioning boss and an engagement portion.

The positioning boss is capable of being inserted into a positioning hole formed in a substrate which is placed next to the one lateral end of the light guide and provided with a light source on a front surface thereof. The positioning boss is formed to extend outwardly in the longitudinal direction of the light guide from the one lateral end of the light guide.

The engagement portion is formed at the one lateral end of the light guide and configured to engage the substrate positioned by the positioning boss to the one lateral end of the light guide to allow the front surface of the substrate to abut on the one lateral end of the light guide and allow the light source to be accommodated in the recess while being kept at a certain distance from the lateral end surface of the light guide.

Furthermore, the positioning boss and the engagement portion are formed integrally with the light guide.

An illumination device according to another aspect of the present disclosure includes the aforementioned light guide and a light source.

The light source is configured to emit light toward an interior of the light guide in the longitudinal direction of the light guide to allow the light to enter the light guide through the lateral end surface.

DETAILED DESCRIPTION

Figure 1:
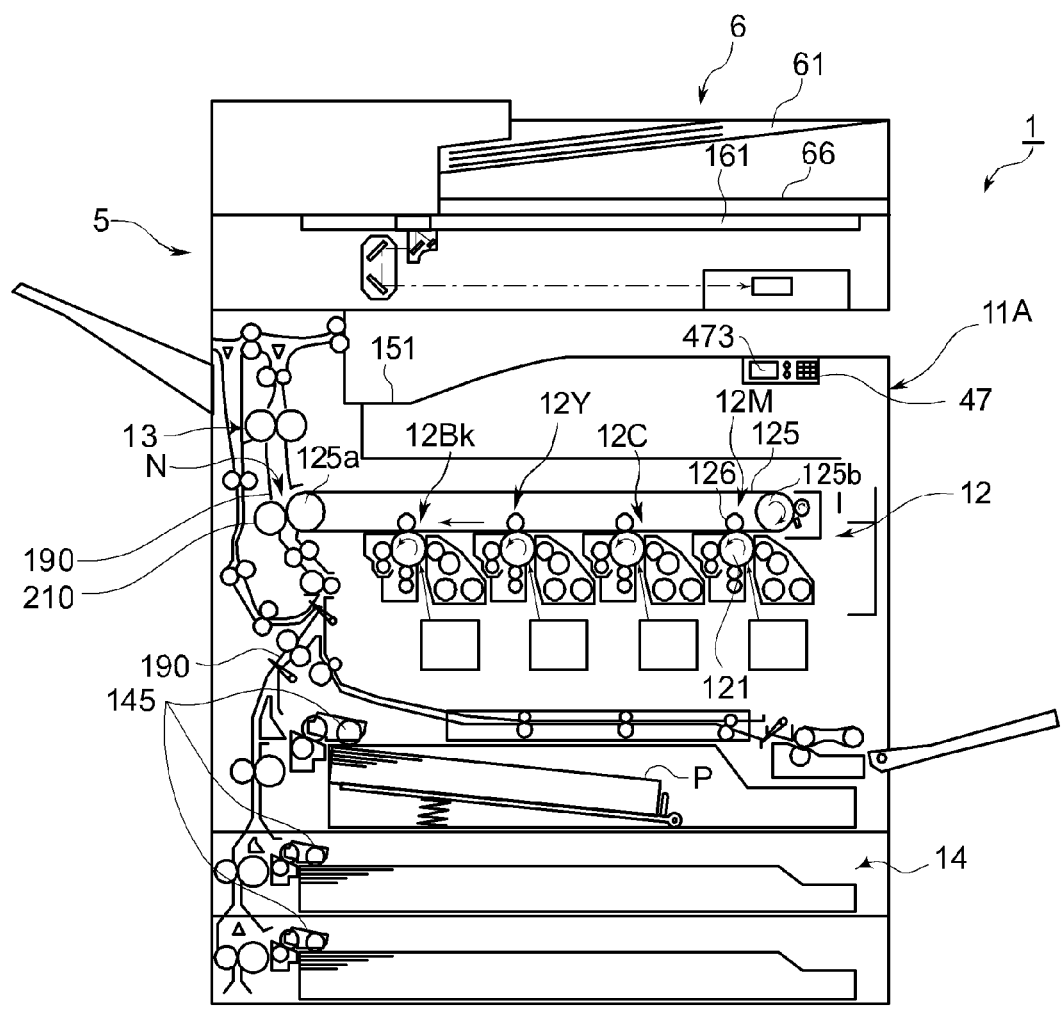
FIG. 1 is a front cross-sectional view showing the structure of an image forming apparatus including an image reading device equipped with an illumination device according to one embodiment of the present disclosure.

Hereinafter, a description will be given of a light guide according to one embodiment of the present disclosure and an illumination device with the light guide with reference to the drawings. FIG. 1 is a front cross-sectional view showing the structure of an image forming apparatus including an image reading device equipped with the illumination device according to the one embodiment of the present disclosure.

The image forming apparatus 1 according to the one embodiment of the present disclosure is a multifunction peripheral having multiple functions including, for example, a copy function, a print function, a scan function, and a facsimile function. The image forming apparatus 1 is made up so that an apparatus body 11A thereof includes an operating section 47, an image forming section 12, a fixing section 13, a paper feed section 14, a document feed section 6, an image reading device 5, and so on.

The operating section 47 is configured to receive operator's commands for various types of operations and processing executable by the image forming apparatus 1, such as a command to execute an image forming operation and a command to execute a document reading operation. The operating section 47 includes a display 473 configured to display operation guidance and so on for the operator.

In a document reading operation of the image forming apparatus 1, the image reading device 5 optically reads an image of an original document being fed from the document feed section 6 or an image of an original document placed on an original glass plate 161 to generate image data. The image data generated by the image reading device 5 is stored on an internal HDD, a network-connected computer or the like.

In an image forming operation of the image forming apparatus 1, the image forming section 12 forms a toner image on a recording paper sheet P serving as a recording medium fed from the paper feed section 14, based on image data generated by the document reading operation, image data received from a network-connected computer or a user terminal, such as a smartphone, or image data stored on the internal HDD. Each of image forming units 12M, 12C, 12Y, and 12Bk of the image forming section 12 includes a photosensitive drum 121, a developing device (not shown) operable to supply toner to the photosensitive drum 121, a toner cartridge (not shown) for holding toner, a charging device (not shown), an exposure device (not shown), and a primary transfer roller 126.

In the case of color printing, the image forming unit 12M for magenta, the image forming unit 12C for cyan, the image forming unit 12Y for yellow, and the image forming unit 12Bk for black of the image forming section 12 form respective toner images on their respective photosensitive drums 121 through charging, exposure, and developing processes based on respective images of respective different color components constituting the above image data and then allow their respective primary transfer rollers 126 to transfer the toner images to an intermediate transfer belt 125 mounted around a drive roller 125a and a driven roller 125b.

The outer peripheral surface of the intermediate transfer belt 125 is set to an image carrying surface to which a toner image is to be transferred. The intermediate transfer belt 125 is driven by the drive roller 125a while engaging against the peripheral surfaces of the photosensitive drums 121. The intermediate transfer belt 125 endlessly runs between the drive roller 125a and the driven roller 125b while synchronizing with the rotation of each photosensitive drum 121.

The toner images of different colors transferred to the intermediate transfer belt 125 are superposed each other on the intermediate transfer belt 125 by controlling their transfer timings, resulting in a multicolor toner image. A secondary transfer roller 210 transfers the multicolor toner image formed on the surface of the intermediate transfer belt 125, at a nip N between the secondary transfer roller 210 and the drive roller 125a with the intermediate transfer belt 125 in between, to a recording paper sheet P conveyed from the paper feed section 14 along a conveyance path 190. Thereafter, the fixing section 13 fixes the toner image on the recording paper sheet P by the application of heat and pressure. The recording paper sheet P having a multicolor image fixed thereon by the completion of the fixing treatment is discharged to a paper output tray 151.

The paper feed section 14 includes a plurality of paper feed cassettes. A control section (not shown) rotationally drives a pick-up roller 145 of the paper feed cassette containing recording paper sheets of the size designated by an operator's command and thereby allows the pick-up roller 145 to feed a recording paper sheet P contained in the paper feed cassette toward the nip N.

Figure 2:
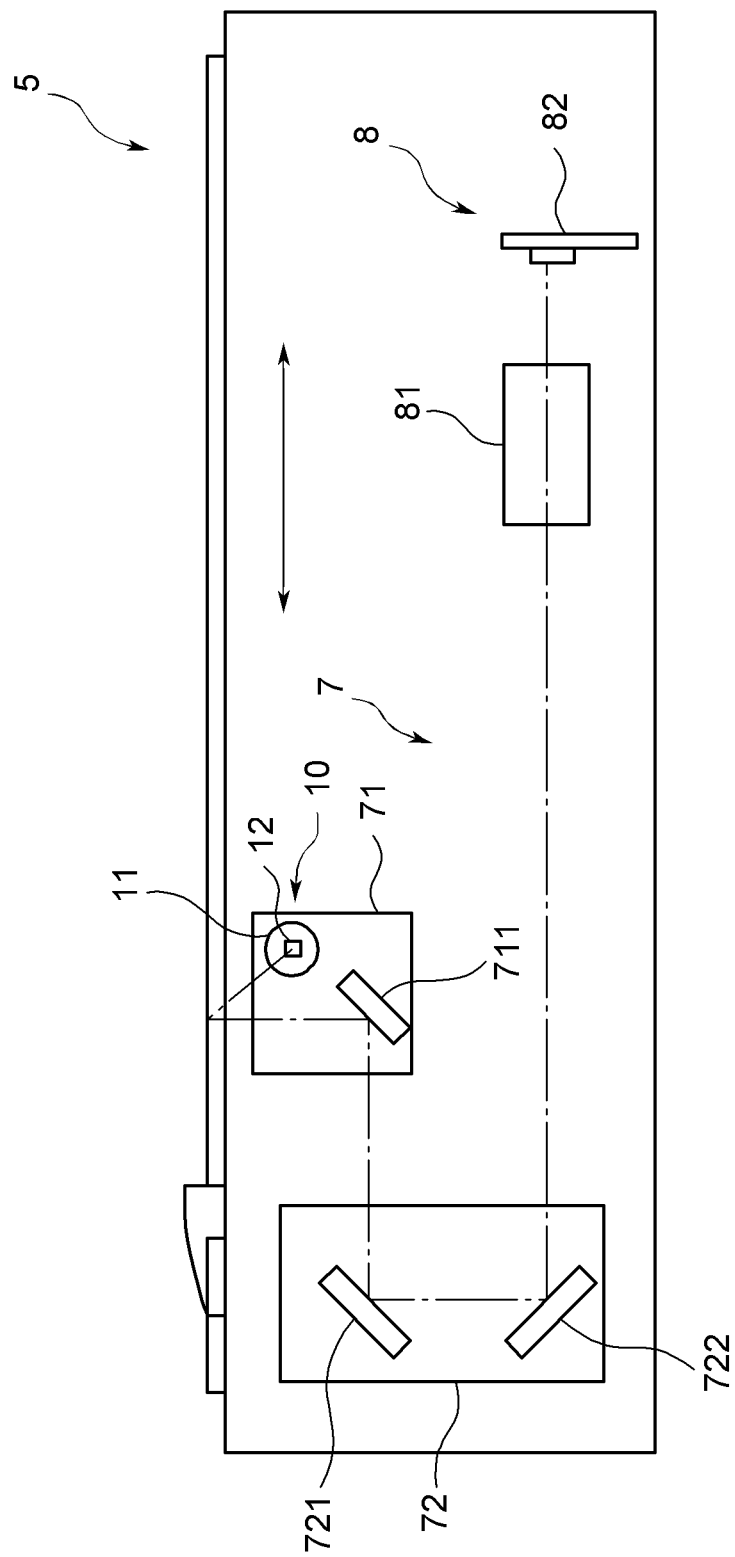
FIG. 2 is an internal side view showing a schematic structure of the image reading device.

Next, a description will be given of the structure of the image reading device 5. FIG. 2 is an internal side view showing a schematic structure of the image reading device 5.

The image reading device 5, as shown in FIG. 2, includes an optical scanning device 7 and an image pickup unit 8.

The optical scanning device 7 includes a first optical system unit 71 and a second optical system unit 72.

The first optical system unit 71 includes an illumination device 10 and a first mirror 711. The illumination device 10 is disposed facing and below the original glass plate 161 in order to illuminate a reading surface of an original document, i.e., illuminate above. The illumination device 10 includes a rod-shaped light guide 11 and a light source 12 disposed at one lateral end of the light guide 11. The illumination device 10 extends in a depth direction of FIG. 2. The direction of extension of the illumination device 10 is a main scanning direction during reading of the original document.

A light beam emitted from the light source 12 enters the light guide 11 through a lateral end surface (incident surface) of the light guide 11. The light beam having entered the light guide 11 propagates through the interior of the light guide 11 while repeating reflection at the inside surfaces of the light guide 11 and is finally reflected at one of prism surfaces arranged in the interior of the light guide 11. The finally reflected light beam is extracted through a surface (exit surface) of the light guide 11 to the outside and illuminates a desired site of an original document surface lying on the original glass plate 161.

The first mirror 711 is configured to receive light reflected on the reading surface of the original document placed on the original glass plate 161 by the application of light of the illumination device 10 to the original document and horizontally redirect the reflected light. The first mirror 711 is disposed below the original glass plate 161. The illumination device 10 and the first mirror 711 are mounted to an unshown support member.

The second optical system unit 72 includes a second mirror 721 and a third mirror 722. The second mirror 721 is configured to receive light reflected by the first mirror 711 of the first optical system unit 71 and redirect the reflected light substantially vertically downward. The third mirror 722 is configured to substantially horizontally redirect the reflected light from the second mirror 721 to guide it toward the image pickup unit 8. The second mirror 721 and the third mirror 722 are mounted to an unshown support member.

Each of the illumination device 10 and the mirrors provided in the first and second optical system units 71, 72 has an elongated shape extending in the main scanning direction and having a length substantially equal to the length of the original glass plate 161.

The image reading device 5 is internally provided with an unshown traveling rail for use to guide the movement of the optical scanning device 7 in the direction of the arrow. Thus, the optical scanning device 7 equipped with the first and second optical system units 71, 72 can reciprocate in a sub-scanning direction (a direction perpendicular to the main scanning direction), i.e., in the direction of the arrow shown in FIG. 2, and in parallel with the surface of the original glass plate 161 to enable reading of image information of the entire reading surface of the original document placed on the original glass plate 161.

The image pickup unit 8 is fixed to a lower portion of the interior of the image reading device 5. The image pickup unit 8 includes an imaging lens 81 as an optical element and a line sensor 82 as an image pickup device. The light reflected on the reading surface of the original document and then reflected by the third mirror 722 of the second optical system unit 72 enters the imaging lens 81. The imaging lens 81 forms an image of the reflected light on a surface of the line sensor 82 provided downstream in the optical path. The line sensor 82 is configured to generate a voltage indicating and according to the intensity of light received thereon, i.e., convert optical information received by its light-receiving element into electrical signals, and output the signals to the unshown control section. In this manner, using the line sensor 82, the image of the original document to be read can be read by the image reading device 5.

Figure 3:
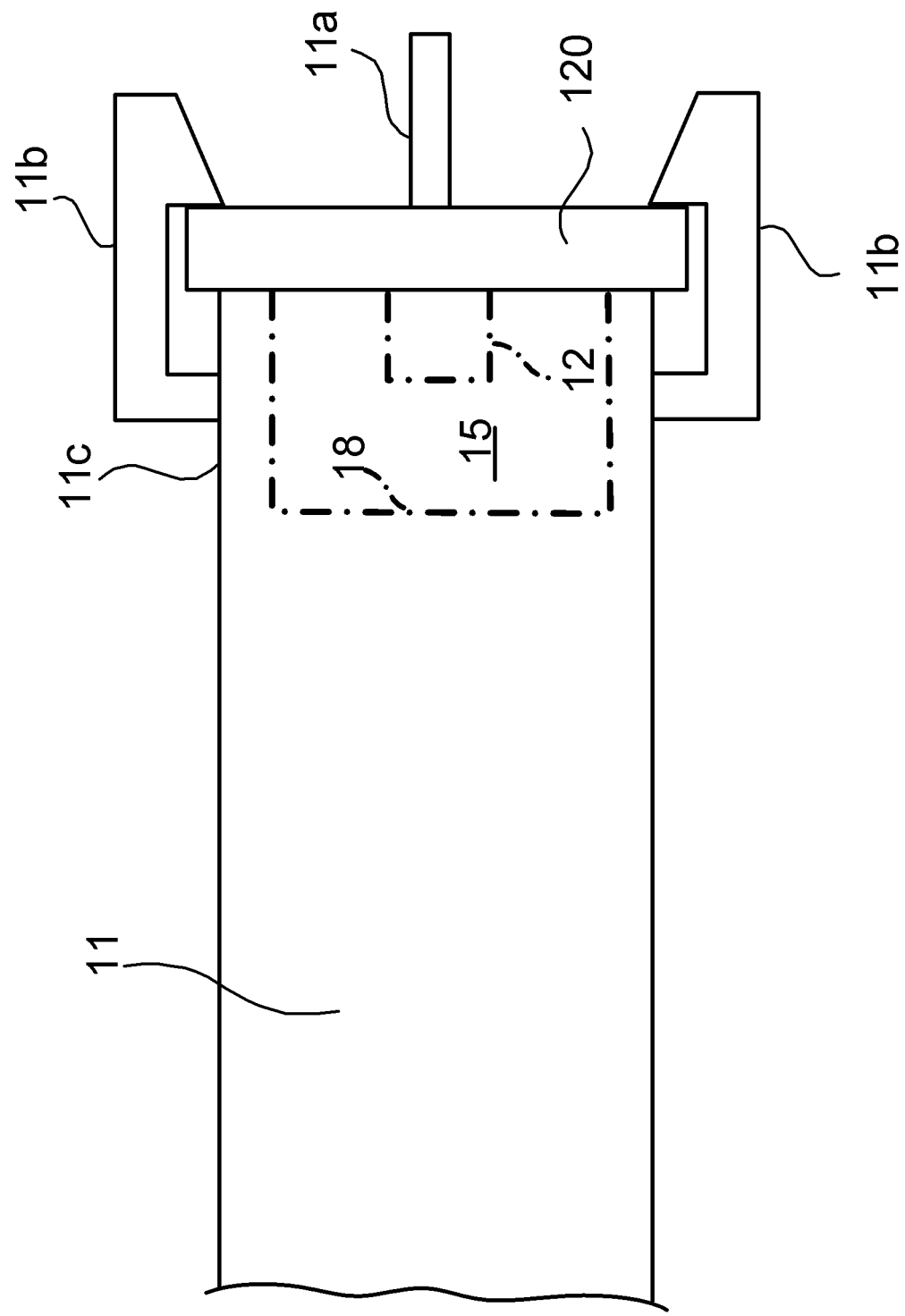
FIG. 3 is a view of one lateral end of the illumination device as seen from a transverse direction thereof.
Figure 4:
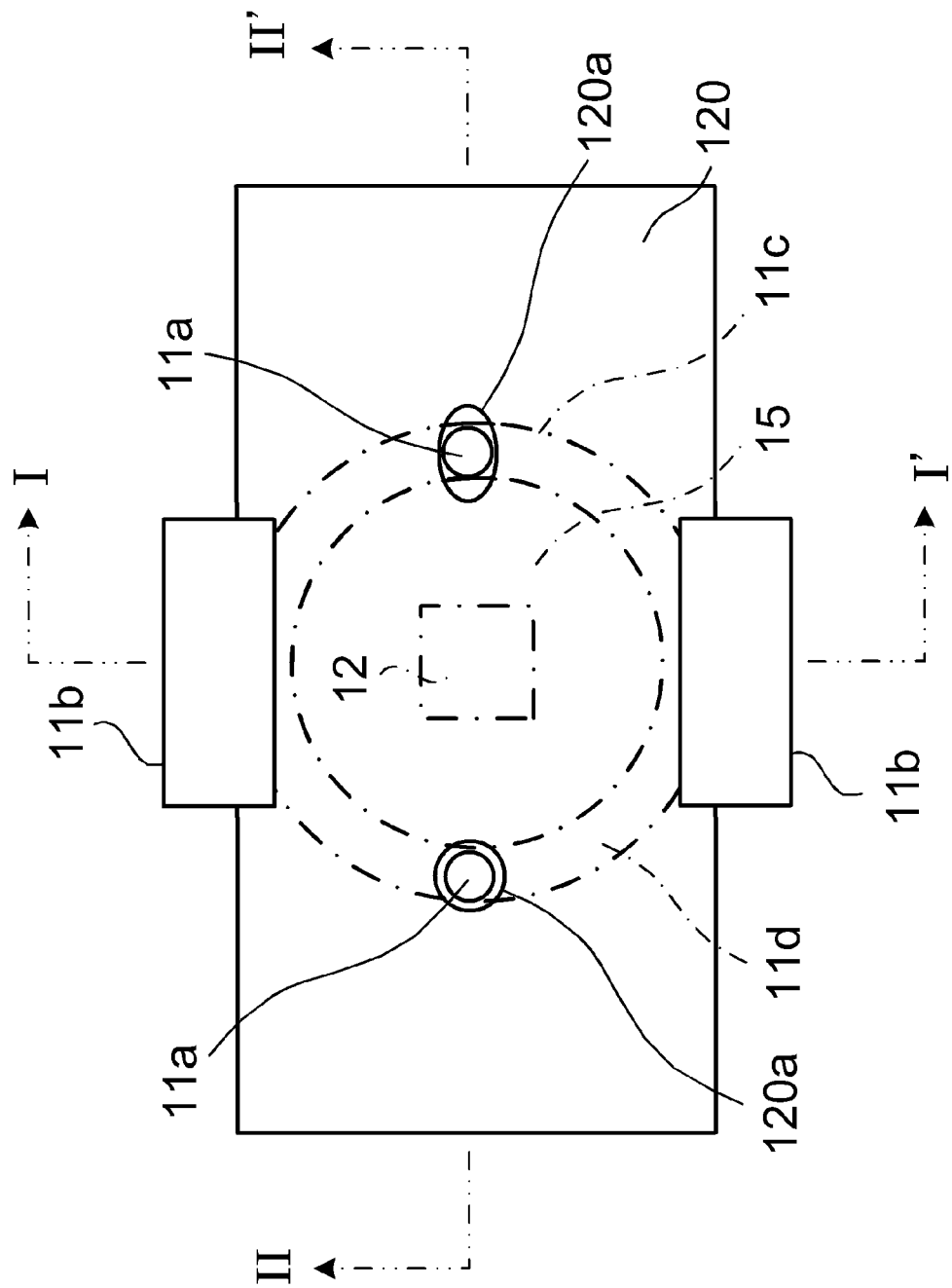
FIG. 4 is a view of the one lateral end of the illumination device as seen from a longitudinal direction thereof.
Figure 5:
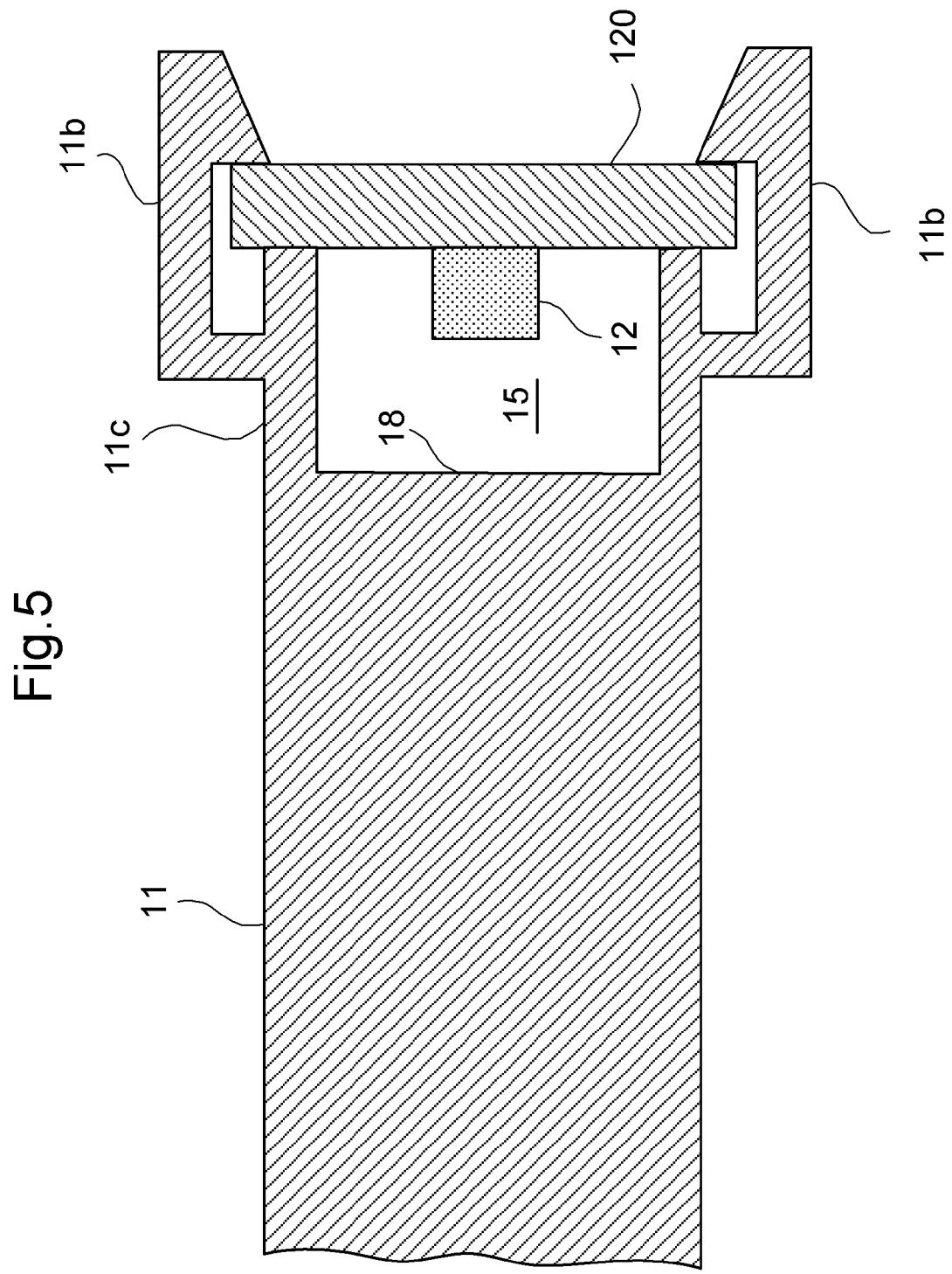
FIG. 5 is a cross-sectional view taken along the line I-I' of FIG. 4.
Figure 6:
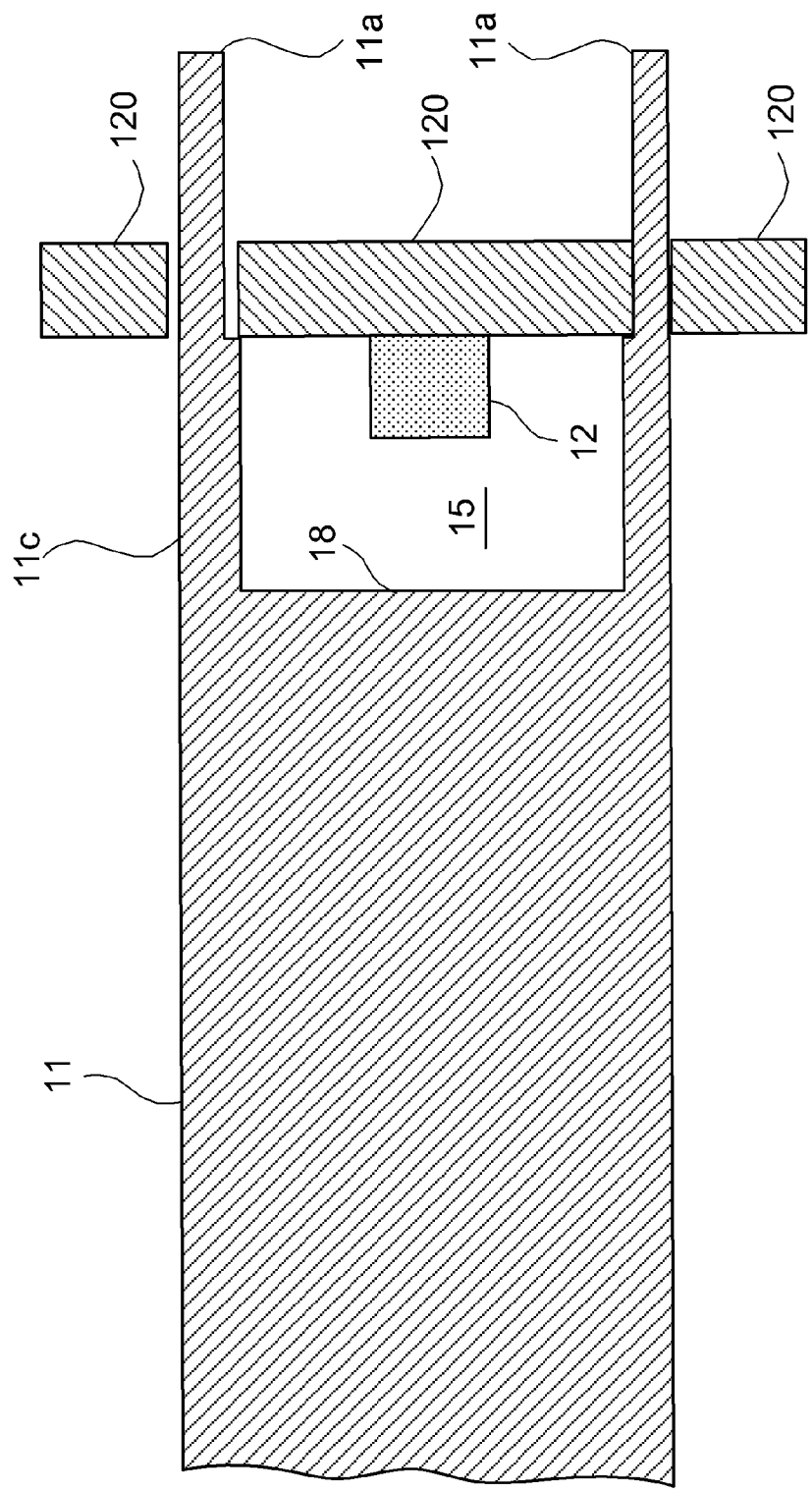
FIG. 6 is a cross-sectional view taken along the line II-II' of FIG. 4.

Next, a description will be given of the illumination device 10 included in the image reading device 5. FIG. 3 is a view of one lateral end of the illumination device 10 as seen from a transverse direction thereof and FIG. 4 is a view of the one lateral end of the illumination device 10 as seen from a longitudinal direction thereof. FIG. 5 is a cross-sectional view taken along the line I-I' of FIG. 4. FIG. 6 is a cross-sectional view taken along the line II-II' of FIG. 4.

The illumination device 10 includes the light guide 11 and the light source 12. The light source 12 is formed of, for example, an LED and mounted on a front surface of a substrate 120. An electric circuit (not shown) for driving the light source 12 is also mounted on the substrate 120.

The light guide 11 extends in a direction of the optical axis of light entering the interior of the light guide 11 from the light source 12. Since the light guide 11 extends in the main scanning direction as described previously, the direction of the optical axis coincides with the main scanning direction. The light guide 11 is formed of a light transmissive member made of, for example, resin and allows an unshown reflective surface thereof to reflect incident light from the light source 12 in a particular direction (a direction toward an exit surface thereof).

The light guide 11 is provided with a recess 15 formed in one lateral end thereof to have a predetermined depth in the longitudinal direction of the light guide 11. The bottom of the recess 15 in the longitudinal direction forms a lateral end surface 18 of the light guide 11 through which a light beam emitted from the light source 12 enters the light guide 11.

The light guide 11 is further provided at the one lateral end with two positioning bosses 11a formed to extend outwardly in the longitudinal direction of the light guide 11 from the one lateral end. The positioning bosses 11a extend in the longitudinal direction of the light guide 11, for example, from the upper end surface 11d of a peripheral wall 11c of the recess 15 and are formed integrally with the light guide 11. Correspondingly, two positioning holes 120a are bored in the substrate 120. In mounting the substrate 120 to the light guide 11, the positioning bosses 11a are inserted each into one of the positioning holes 120a. Thus, the vertical and horizontal positions of the light source 12 relative to the lateral end surface 18 can be ensured.

One of the two positioning holes 120a in the substrate 120 (the left positioning hole 120a in FIG. 4) has a diameter substantially equal to the outside diameter of the positioning bosses 11a, so that the positioning boss 11a can be fitted substantially closely into the positioning hole 120a. The other positioning hole 120a (the right positioning hole 120a in FIG. 4) has a shape somewhat greater in a direction of a line connecting the two positioning bosses 11a (in the lateral direction in FIG. 4 and the radial direction of the light guide 11) than the outside diameter of the positioning bosses 11a. Thus, even if the distance between the two positioning bosses 11a somewhat varies owing to a production error or so on, the two positioning bosses 11a can be inserted into the two positioning holes 120a.

The light guide 11 is further provided at the one lateral end with two engagement portions 11b configured to engage the substrate 120 positioned by the positioning bosses 11a to the one lateral end of the light guide 11. The engagement portions 11b are provided, for example, on the outer periphery of the light guide 11 by integral formation with the light guide 11. The two engagement portions 11b are disposed on the line perpendicular to the line connecting the two positioning bosses 11a. The two positioning bosses 11a are disposed facing each other at radially opposite sides of the light guide 11. The engagement portions 11b are disposed at another radially opposite sides of the light guide 11 on the line perpendicular to the line connecting the two positioning bosses 11a.

The engagement portions 11b have their respective pawls. The pawls are configured to engage on the back surface of the substrate 120 to hold the substrate 120 on the one lateral end of the light guide 11. When the substrate 120 is held on the one lateral end of the light guide 11 by the engagement portions 11b, the front surface of the substrate 120 abuts on the one lateral end of the light guide 11 and the light source 12 is held accommodated in the recess 15 while being kept at a certain distance from the lateral end surface 18.

In other words, the engagement portions 11b are configured to come into contact with fringe portions of the substrate 120 positioned by the positioning bosses 11a and the distal ends of the engagement portions 11b have the pawls which are projections toward the middle of the substrate 120. The projections are configured to engage on the back surface of the substrate 120 opposite to the front surface thereof facing the light guide 11.

Thus, the light source 12 can be accommodated in the peripheral wall 11c of the recess 15, that is, a hollow light guide member, so that leakage of light can be prevented and the distance between the lateral end surface 18 and the light source 12 can be accurately ensured.

The distal ends of the two positioning bosses 11a may extend in the longitudinal direction of the light guide 11 beyond the distal ends of the two engagement portions 11b. Thus, in mounting the substrate 120 to the light guide 11, the two positioning bosses 11a can be first inserted into the two positioning holes 120a to position the light source 12 and the substrate 120 can be then pressed in to engage the substrate 120 to the one lateral end of the light guide 11 using the two engagement portions 11b. This facilitates the mounting of the substrate 120.

As seen from the above, according to this embodiment, the accuracy of positions of the light guide 11 and the light source 12 can be ensured with a small number of parts. Furthermore, the assembly of the light guide 11 and the light source 12 can be simplified to reduce the assembly man-hours in production.

For example, the image reading device described in BACKGROUND has a structure in which a hollow light guide member is disposed between a light guide and a light source in order to keep a distance between the light guide and the light source and avoid thermal effects. However, the image reading device does not have any structure ensuring the accuracy of vertical and horizontal positions of the light guide and the light source and is given no specific structure for fixing the light source.

In contrast, according to this embodiment, it is possible to ensure the accuracy of positions of the light guide 11 and the light source 12, facilitate the assembly of the light guide 11 and the light source 12, and prevent the leakage of light from between the light guide 11 and the light source 12.

The present disclosure is not limited to the above embodiment and can be modified in various ways. For example, although in the above embodiment the image forming apparatus according to the present disclosure has been described taking a multifunction peripheral as an example, the multifunction peripheral is merely illustrative. The image forming apparatus according to the present disclosure may be other electronic apparatuses, including a copier and a facsimile machine.

The structure and processing given in the above embodiment with reference to FIGS. 1 to 6 are merely illustrative of the present disclosure and the present disclosure is not intended to be limited to the above particular structure and processing.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. A rod-shaped light guide operable to guide light incident on a lateral end surface thereof to exit the light through a surface thereof, the light guide being provided with:

a recess formed in one lateral end of the light guide to have a predetermined depth in a longitudinal direction of the light guide, a bottom of the recess in the longitudinal direction forming the lateral end surface of the light guide;

a positioning boss capable of being inserted into a positioning hole formed in a substrate, the substrate being placed next to the one lateral end of the light guide and provided with a light source on a front surface thereof, the positioning boss being formed to extend outwardly in the longitudinal direction of the light guide from the one lateral end of the light guide; and an engagement portion formed at the one lateral end of the light guide and configured to engage the substrate positioned by the positioning boss to the one lateral end of the light guide to allow the front surface of the substrate to abut on the one lateral end of the light guide and allow the light source to be accommodated in the recess while being kept at a certain distance from the lateral end surface of the light guide, wherein the positioning boss and the engagement portion are formed integrally with the light guide.

2. The light guide according to claim 1, wherein a distal end of the positioning boss extends in the longitudinal direction of the light guide beyond a distal end of the engagement portion.

3. The light guide according to claim 2, wherein the positioning boss comprises two positioning bosses disposed facing each other at radially opposite sides of the light guide, the positioning hole formed in the substrate comprises two positioning holes located corresponding to the two positioning bosses, and one of the two positioning holes has a diameter equal to or slightly greater than an outside diameter of the positioning bosses and the other positioning hole has a shape somewhat greater in a direction of a line connecting the two positioning bosses than the outside diameter of the positioning bosses.

4. The light guide according to claim 1, wherein the positioning boss comprises two positioning bosses disposed facing each other at radially opposite sides of the light guide, and the engagement portion comprises two engagement portions disposed at another radially opposite sides of the light guide on a line perpendicular to a line connecting the two positioning bosses.

5. The light guide according to claim 1, wherein the engagement portion is configured to come into contact with a fringe portion of the substrate positioned by the positioning boss, a distal end of the engagement portion has a projection toward a middle of the substrate, and the projection is configured to engage on a back surface of the substrate opposite to the front surface thereof facing the light guide.

6. An illumination device comprising:

the light guide according to claim 1; and a light source configured to emit light toward an interior of the light guide in the longitudinal direction of the light guide to allow the light to enter the light guide through the lateral end surface.

* * * * *